A. CLARK.
Meat Cutter.
No. 4,507.
Patented May 9, 1846.
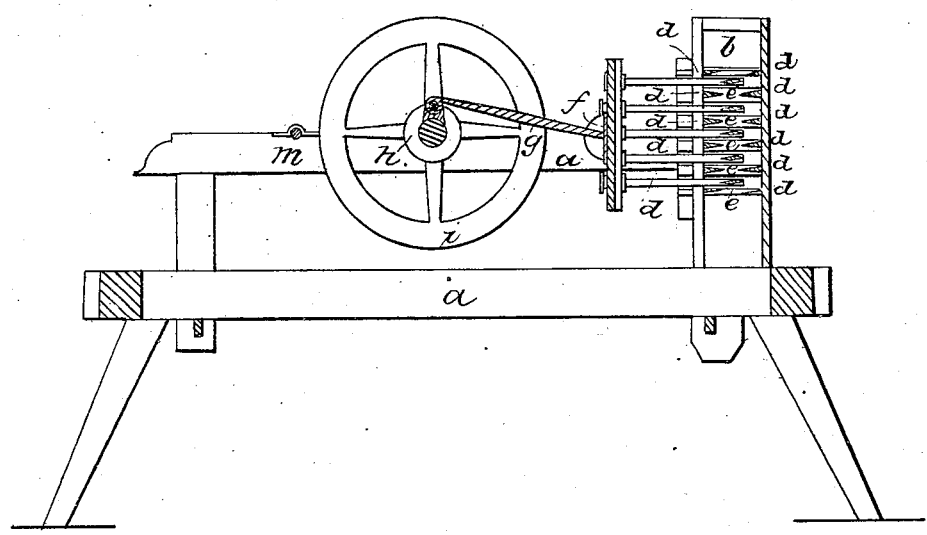
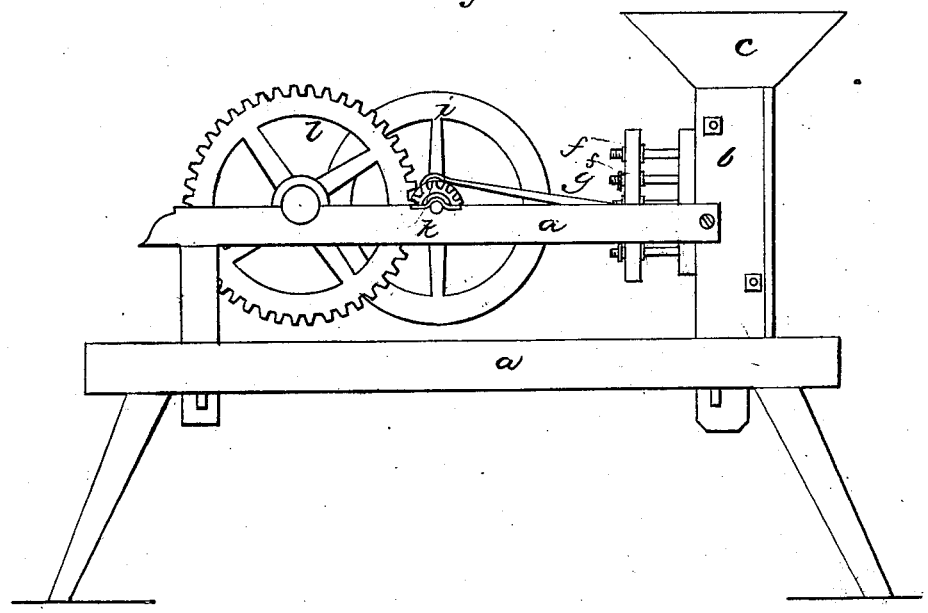

UNITED STATES PATENT OFFICE.

ABISHAI CLARK, OF DOE RUN, PENNSYLVANIA.

IMPROVEMENT IN MEAT-CUTTER.

Specification of Letters Patent No. 4,507, dated May 9, 1846.

*To all whom it may concern:*

Be it known that I, ABISHAI CLARK, of Doe Run, in the county of Chester and State of Pennsylvania, have invented a new and useful Improvement in Machinery for Cutting Meat, and that the following is a full, clear, and exact description of the principle or character thereof which distinguishes it from all other things before known and of the manner of making, constructing, and using the same, reference being had to the accompanying drawings, making part of this specification, in which—

Figure 1 is a side elevation, and Fig. 2, a vertical longitudinal section, through the center of the machine.

The same letters indicate like parts in all the figures.

In the various devices for cutting meat, &c., a difficulty has constantly arisen from clogging when used on a large scale, or the meat has not been cut fine enough, or with sufficient rapidity; and it is to obviate these objections that my machine was devised.

In the accompanying drawings, (*a, a*) represent a frame for supporting the apparatus (*b*) is an oblong box in which the cutting knives are fixed, and it is fastened on one end of the frame (*a*), and open above and below. On its top a hopper (*c*) is put for receiving the meat to be cut, and below a vessel is placed to receive the meat after it is cut. Within the box (*b*) above named are affixed two rows of horizontal knives (*d*) the backs of which are placed against opposite sides of the box and the knives in each row are put at sufficient distances apart one above another and parallel. Between these two rows of knives is another set (*e*), the knives of which are sharpened on both edges and attached to a movable frame (*f*), so as to play back and forth across the box horizontally and pass in between the stationary knives so as to cut whatever is between them. The movable frame is connected by a pitman and connecting link (*g*) with a crank or a shaft (*h*) on which there is also a balance wheel (*i*) and a pinion (*k*) which gears into and is driven by a spur wheel (*l*) on a parallel shaft (*m*) in the same frame. This last named shaft has a hand crank or pulley attached to it by which it is driven.

To operate this machine the meat is put into the hopper, and the knives (*e*) are put in motion, which causes the meat to descend and pass between the sets of knives, and is cut sufficiently fine before it passes them all.

What I claim as my invention and desire to secure by Letters Patent, is—

A series of knives moving from side to side of a square box or tube as herein set forth, having stationary knives to play between, in the manner and for the purpose set forth.

ABISHAI CLARK.

Witnesses:
  J. J. GREENOUGH,
  SAML. H. HANY.